UNITED STATES PATENT OFFICE.

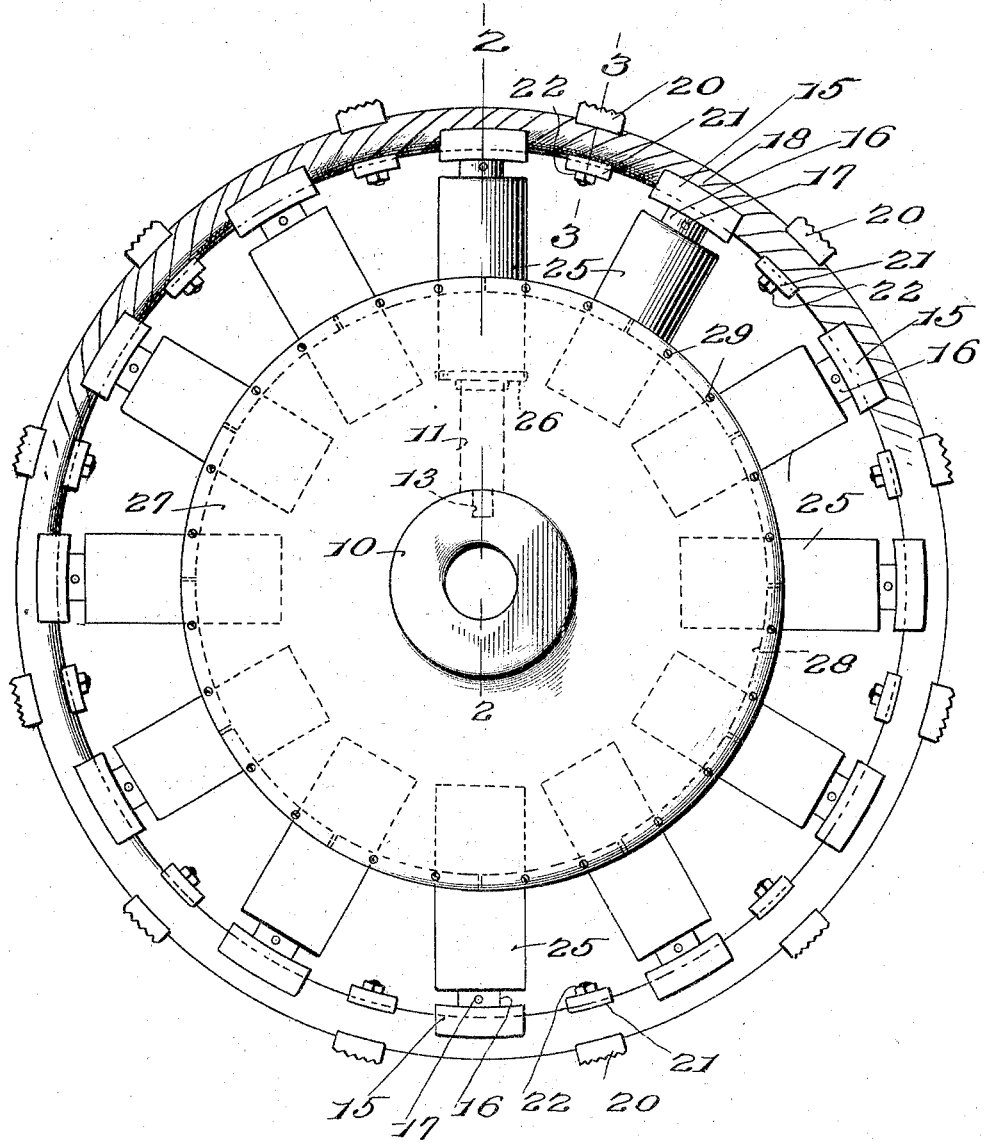

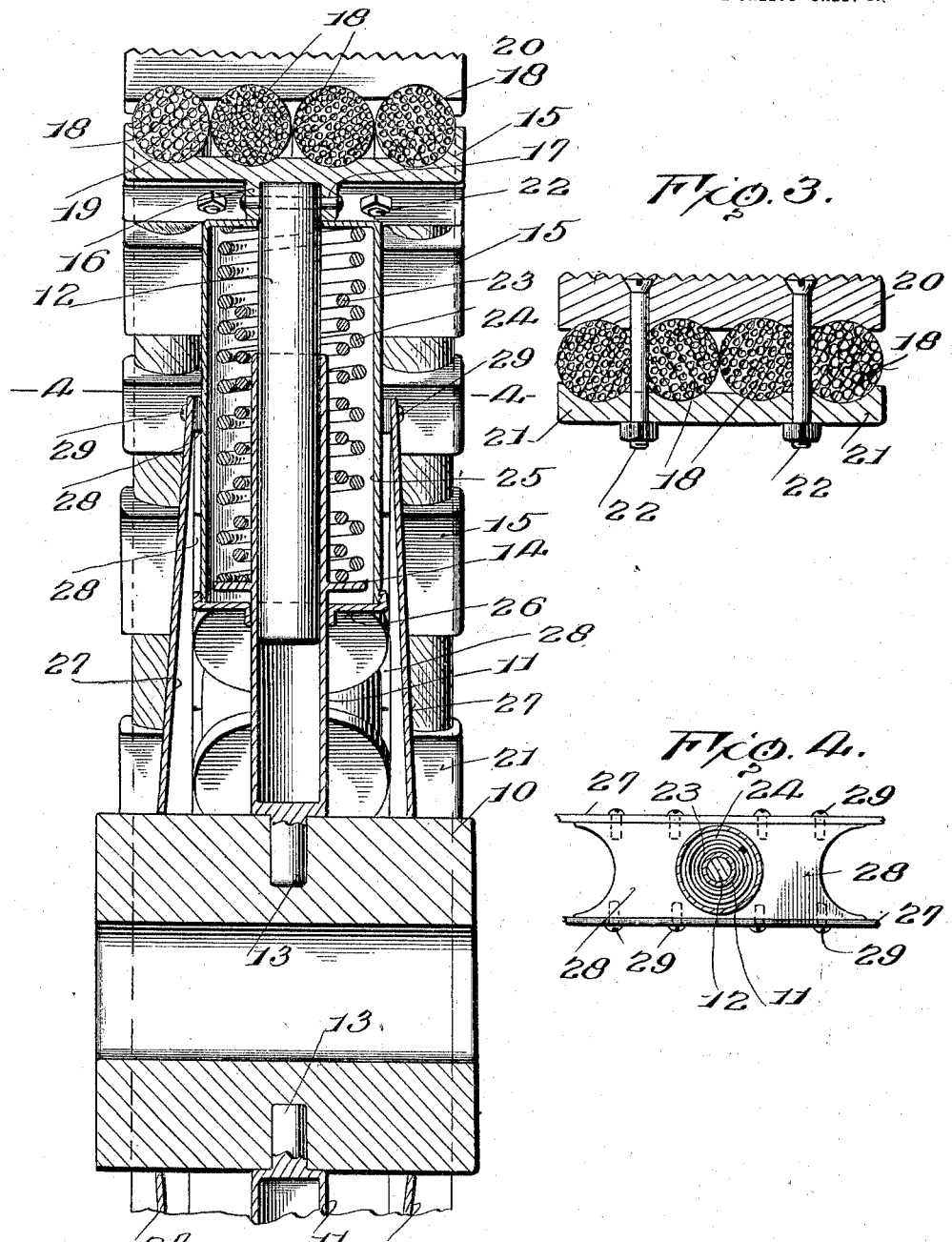

ARTHUR H. PARENT, OF BALTIC, CONNECTICUT.

SPRING-WHEEL.

1,302,840.      Specification of Letters Patent.      Patented May 6, 1919.

Application filed May 8, 1918. Serial No. 233,188.

*To all whom it may concern:*

Be it known that I, ARTHUR H. PARENT, citizen of the United States, residing at Baltic, in the county of New London and State of Connecticut, have invented certain new and useful Improvements in Spring-Wheels, of which the following is a specification.

This invention relates to an improved spring wheel and has as its primary object to provide a construction designed to eliminate the necessity for the use of a pneumatic or resilient tire for the wheel.

The invention has as a further object to provide a construction wherein the wheel spokes will be formed of telescopic sections and wherein suitable springs will be employed for yieldably supporting the outer sections of the said spokes for movement within the inner spoke sections.

The invention has as a still further object to provide a construction wherein the spokes will be effectually supported and braced with respect to each other and wherein housing plates for the spokes will be provided and employed to support bracing blocks between the spokes.

And the invention has as a still further object to provide a wheel employing a flexible rim designed to localize shock upon the wheel upon meeting with an obstruction in the road surface.

Other and incidental objects will appear as the description proceeds. In the drawings wherein I have illustrated the preferred embodiment of the invention, and wherein similar reference characters designate corresponding parts throughout the several views:

Figure 1 is a side elevation showing a wheel constructed in accordance with the present invention.

Fig. 2 is a fragmentary vertical transverse sectional view taken on the line 2—2 of Fig. 1 and more particularly showing the construction of the spokes of the wheel.

Fig. 3 is a transverse sectional view taken on the line 3—3 of Fig. 1 and more particularly illustrating the mounting of the grip cleats upon the tread of the wheel, and Fig. 4 is a fragmentary sectional view taken on the line 4—4 of Fig. 2 and particularly illustrating the mounting of the brace blocks between the spokes of the wheel.

In carrying out the invention my improved wheel is formed with a hub 10 which may be constructed in any suitable manner for operatively receiving an axle therethrough. Radiating from the hub is a plurality of spokes, each of which is formed with a hollow inner section 11 telescopically receiving a solid outer spoke section 12 slidably fitting snugly within the inner section. At their inner ends, the inner spoke sections are formed with lugs 13 embedded in the hub for connecting the spokes therewith and formed on the said inner spoke sections intermediate of their ends are annular radial flanges 14. Mounted upon the outer ends of the outer spoke sections 12 are saddle plates 15 extending transversely with respect to the said spoke sections and formed upon the inner sides thereof are sockets 16 snugly receiving the outer ends of the outer sections of the spokes therein and having the said spoke sections connected therewith by suitable pins 17 extending diametrically through the said sockets. Supported by the saddle plates 15 to surround the spokes in concentric relation to the hub 10 is the flexible rim of the wheel. This rim is, as particularly shown in Figs. 2 and 3 of the drawings, formed of a plurality of suitable cables 18 each joined at its ends to form a ring fitting within the said saddle plates. In this connection it will be noted that the saddle plates are formed with concave seats 19 to receive the said cables and preferably the cables are of a diameter to abut each other within the saddle plates. Securing the cables together at points between the spokes are a plurality of connecting clamps therefor. These clamps, as particularly shown in Fig. 3, each include a tread block or cleat 20 arranged to overlie the cables to extend transversely thereof upon their outer sides and formed with a roughened outer face for engagement with the road surface. Upon its inner side the tread block is formed with concave seats to receive the said cables and extending transversely of the cables therebeneath is a coacting cleat 21. This cleat, upon its inner side, is also formed with concave seats to engage the cables of the rim and connecting the cleats of the clamp are bolts 22 adjustable for tightly binding the said cables between the cleats. As will be seen, the several connecting clamps will prevent separation of the cables of the rim while, at the same time, the said cables will be allowed to flex.

Fitted over the outer extremity of the inner section 11 of each of the spokes to surround the outer spoke sections 12, is a pair of helical springs 23 and 24. The spring 23 of each pair is loosely received within the spring 24 and is somewhat shorter than this latter spring. At their inner ends, the said cushioning springs engage the flanges 14 of the inner spoke sections to be supported thereby and inclosing the said springs are cylindrical casings 25. At their outer ends these casings slidably receive the outer spoke sections 12 therethrough so that said casings abut the sockets 16 of the saddle plates 15 and closing the inner ends of the casings are closure caps 26 threaded upon the said sections and slidably receiving the inner spoke sections 11 therethrough. The spokes thus extend axially through the casings and slidably support the said casings for movement radially with respect to the hub 10 thereon. It is now to be observed that the springs 24 will normally bear between the outer ends of the casings and the flanges 14 of the inner spoke sections to yieldably maintain the outer sections 12 of the spokes extended with respect to the inner spoke sections. These springs will, therefore, act upon the outer sections of the spokes to maintain the flexible cables 18 of the rim tensioned. Furthermore, when the wheel is carrying a load such as would flex or depress the rim at the lower side of the wheel these springs 24 will act upon the outer sections of the spokes throughout the remaining portion of the wheel for immediately taking up any slack occurring in the cables of the rim and a like result would follow should the wheel meet with an obstruction in the roadway to cause a flattening of the rim or flexing of the rim cables at the point of contact with such obstruction. Outward movement of the outer spoke sections 12 within the inner sections 11 of the spokes will, of course, be limited by the engagement of the inner ends of the casings with the flanges 14 of the latter spoke sections so that unnecessary radial distortion of the rim at any point around its periphery will be prevented.

Fitting around the hub 10 at opposite ends thereof are coacting concavo-convex housing plates 27 arranged with their concave faces confronting. These plates are of a diameter to extend substantially midway of the spring casings 25 and at their peripheries support bracing blocks 28 therebetween. The bracing blocks are received between the spring casings, being cut away as particularly shown in Fig. 4, to fit around the said casings and are connected with the housing plates by screws or other suitable fastening devices 29. Thus, the bracing blocks will be rigidly supported in position while, at the same time, the housing plates will be firmly connected at their outer margins by the said blocks. The blocks 28 slidably receive the spring casings 25 therebetween so that these casings may move radially upon the blocks. However, as will be clear, the said blocks will coact with the spring casings to firmly brace and support the spokes with respect to each other while the housing plates 27 will act to prevent mud or other foreign matter from collecting between and clogging the spokes at their inner extremities.

As will now be seen in view of the preceding description, the cushioning springs 24 will act upon the outer sections 12 of the spokes to normally receive the weight of a load upon the rim and under ordinary circumstances, will yieldably sustain such load. However, should the wheel be subjected to an excessive load or should the wheel meet an obstruction in the roadway such as would cause compression of the springs 24, the spring casings 25 will then be shifted inwardly upon the spokes to engage the springs 23 when both of the springs of each pair upon the several spokes will coact for yieldably sustaining the load. I, therefore, provide a wheel which will effectually cushion the load and since the wheel is constructed with a rim adapted to be yieldably flexed in a manner similar to the flexing of a pneumatic resilient tire, the wheel will be possessed of similar resilient qualities and the necessity for the use of such tires accordingly eliminated.

Having thus described the invention, what is claimed as new is:

1. A spring wheel including a hub, a rim surrounding the hub, spokes supporting the rim with respect to the hub and each formed of telescopic inner and outer sections, casings slidable upon the spokes, yieldable means housed within said casings and operatively bearing radially between the inner spoke sections and said casing for urging the outer sections of the spokes outwardly with respect to the inner sections thereof, housing plates confronting opposite sides of the spokes at their inner extremities, and a plurality of independent brace blocks supported by said housing plates between the spokes for bracing the spokes with respect to each other, said brace blocks being formed at their ends to fit around and slidably receive the said casings therebetween.

2. A spring wheel including a hub, a rim surrounding the hub, spokes supporting the rim with respect to the hub and each formed of telescopic inner and outer sections, casings surrounding the spokes and independent thereof, said casings slidably receiving the inner and outer spoke sections respectively through opposite ends thereof, and yieldable means housed within said casings and operatively bearing radially between the inner spoke sections and the casings for urging the outer sections of the spokes outwardly with respect to the inner sections thereof.

3. A spring wheel including a hub, a rim surrounding the hub, spokes supporting the rim with respect to the hub and each formed of telescopic inner and outer sections, casings surrounding the spokes, said casings being closed at their outer ends and open at their inner ends and having the outer spoke sections received through the closed ends thereof, yieldable means housed within the casings for urging the outer sections of the spokes outwardly with respect to the inner sections thereof, and caps slidably receiving the inner spoke sections therethrough and closing the casings at their inner ends.

4. A spring wheel including a hub, a rim surrounding the hub, spokes supporting the rim with respect to the hub and each formed of telescopic inner and outer sections, casings slidably fitted upon the spokes, yieldable means housed within said casings and operatively bearing radially between the inner spoke sections and the casings for shifting the casings outwardly upon the spokes, stop means limiting the casings in their outward movement relative to the outer sections of the spokes whereby said yieldable means will urge the outer spoke sections outwardly with respect to the inner sections of the spokes, and stop means for limiting the casings in their outward movement relative to the inner spoke sections.

5. A spring wheel including a hub, a rim surrounding the hub, spokes supporting the rim with respect to the hub and each formed of telescopic inner and outer sections, casings fitted upon the spokes and removable from the spokes at the outer ends thereof, means carried by the casings and coacting with the spokes for detachably connecting the casings therewith, and yieldable means housed within the casings and operatively bearing radially between the inner spoke sections and said casings for urging the outer sections of the spokes outwardly with respect to the inner sections thereof.

6. A spring wheel including a hub, a rim surrounding the hub, spokes supporting the rim with respect to the hub and each formed of telescopic inner and outer sections, flanges formed on the inner spoke sections, casings slidably fitted over the spokes and removable from the spokes at the outer ends thereof, caps connected to the inner ends of said casings and adapted to coact with said flanges for detachably connecting the casings with the spokes, and yieldable means housed within the casings and operatively bearing radially between the inner spoke sections and said casings for urging the outer sections of the spokes outwardly with respect to the inner sections thereof.

7. A spring wheel including a hub, a rim surrounding the hub, spokes supporting the rim with respect to the hub and each formed of inner and outer telescopic sections, flanges carried by the inner spoke sections, casings surrounding the spokes and independent thereof, stop means for the casings connected with the outer spoke sections, and yieldable means housed within said casings and operatively bearing radially between the casings and said flanges for urging the outer sections of the spokes outwardly with respect to the inner sections thereof.

In testimony whereof I affix my signature.

ARTHUR H. PARENT. [L. S.]